(No Model.)
2 Sheets—Sheet 1.

T. F. GILROY.
GLASS BEVELING MACHINE.

No. 359,439.
Patented Mar. 15, 1887.

Witnesses:

Inventor:
T. F. Gilroy
by Oscar J Gunz
Attorney (No Model.) 2 Sheets—Sheet 2.

T. F. GILROY.
GLASS BEVELING MACHINE.

No. 359,439. Patented Mar. 15, 1887.

Witnesses:
Otto Beyer
A. Gunz.

Inventor:
T. F. Gilroy
by Oscar Gunz
Attorney.

UNITED STATES PATENT OFFICE.

THOMAS F. GILROY, OF NEW YORK, N. Y.

GLASS-BEVELING MACHINE.

SPECIFICATION forming part of Letters Patent No. 359,439, dated March 15, 1887.

Application filed April 1, 1886. Serial No. 197,382. (No model.)

*To all whom it may concern:*

Be it known that I, THOMAS F. GILROY, a citizen of the United States, and a resident of New York, in the county of New York and State of New York, have invented certain new and useful Improvements in Glass-Beveling Machines, of which the following is a specification.

The object of my invention is to provide a new and improved machine for beveling the edges of circular or oval glass plates, which machine is simple in construction, operates rapidly and accurately, and is provided with adjustable stops for preventing grinding too much from the edges of the glass.

The invention consists in the construction and combination of parts and details, as will be fully described and set forth hereinafter, and then pointed out in the claims.

Figure 1:
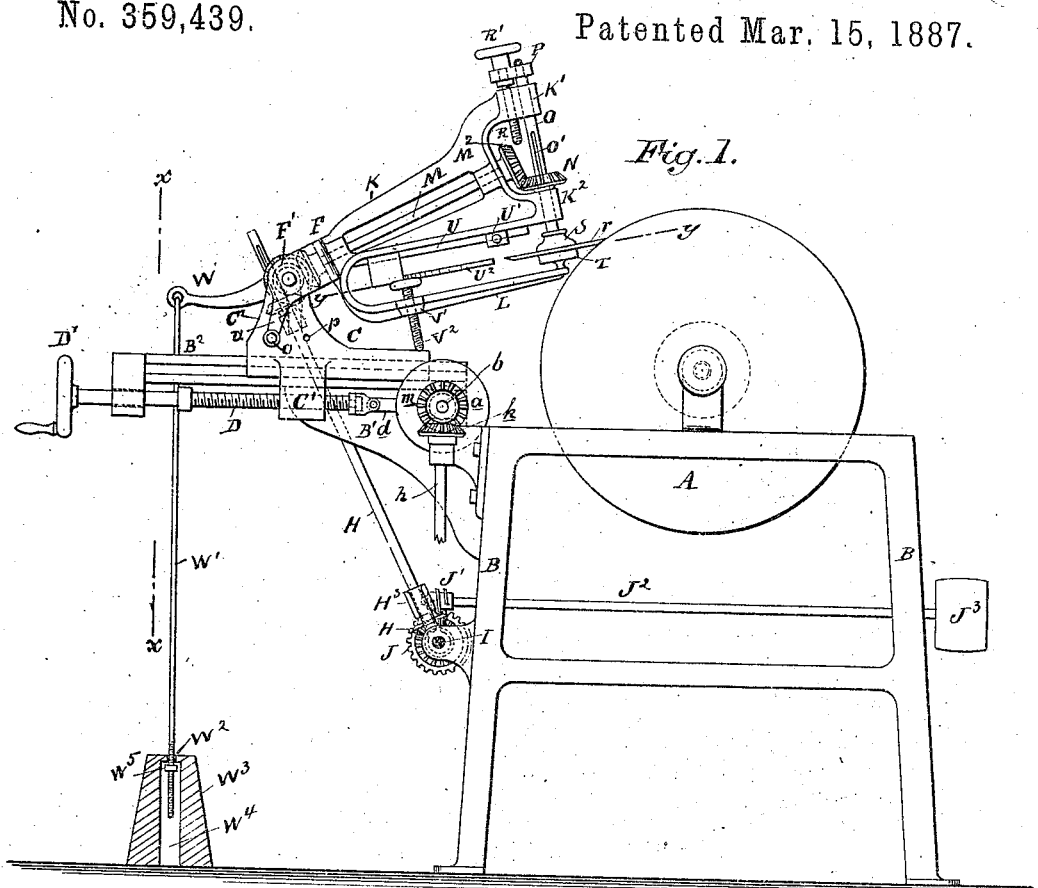
Figure 2:
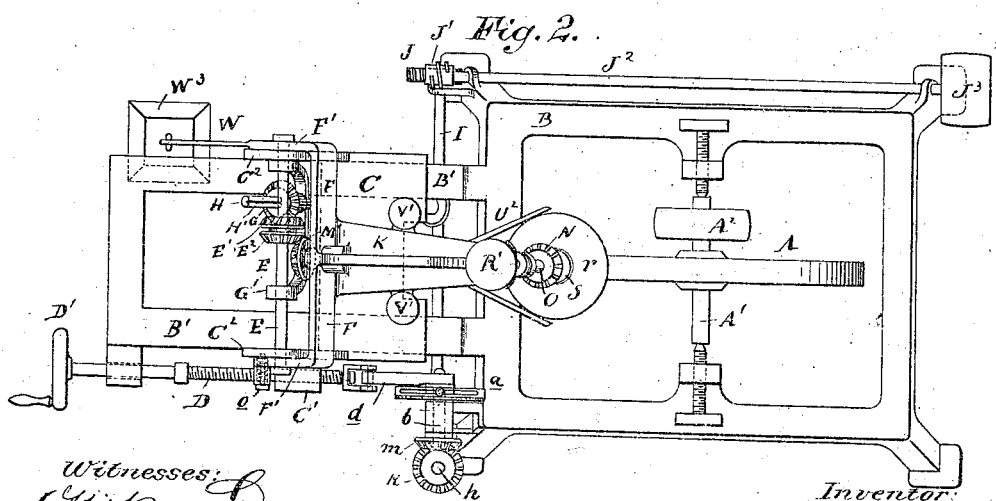
Figure 4:
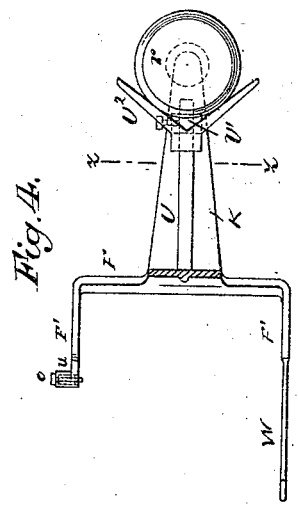
Figure 5:
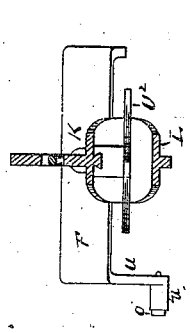
Figure 6:
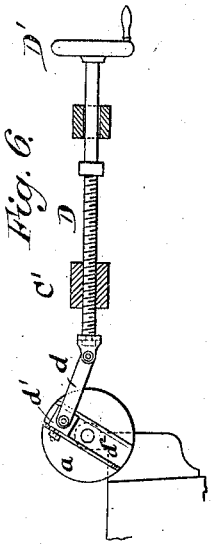
Figure 3:
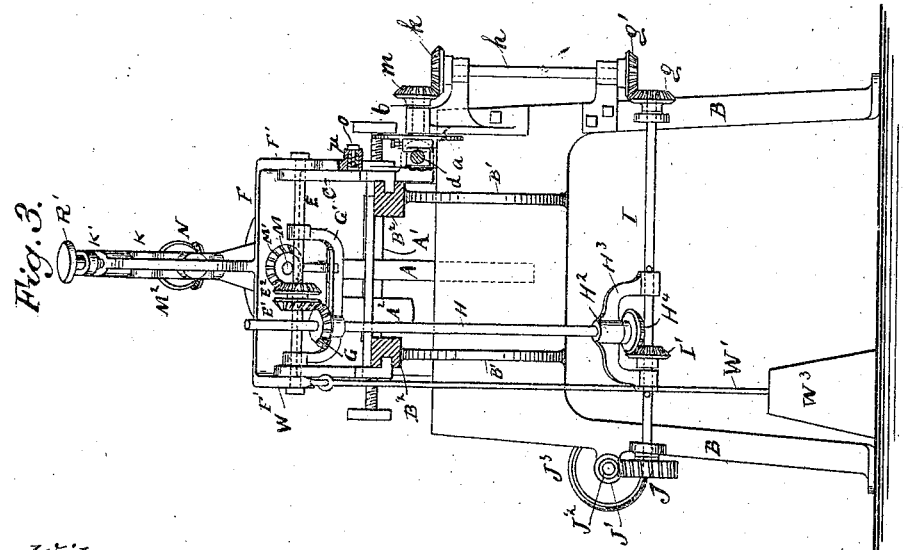

In the accompanying drawings, forming a part of this specification, and in which like letters of reference indicate like parts, Figure 1 is a side view of my improved glass-beveling machine. Fig. 2 is a plan view of the same.
Fig. 3 is an end view of the same, parts being shown in section on the line $x\ x$, Fig. 1. Fig. 4 is a plan view of the under side of the arm on which the gage is held, parts being in section on the line $y\ y$, Fig. 1. Fig. 5 is a detail cross-sectional view of the swinging frame on the line $x\ x$, Fig. 2. Fig. 6 is a detail view showing the device for reciprocating the screw.

The abrading-disk A is mounted on the shaft A′, journaled in the frame B, said shaft carrying the belt-pulley A². The frame B is provided at one end with the arms B′, on which the horizontal track-bars B² are formed, and on said track-bars the carriage C is mounted to slide toward and from the end of the frame B, which carriage is provided with the lug C′ on the under side, the said lug forming a nut through which the screw D is passed, which screw is provided at its outer end with the hand-wheel D′, and has its inner end swiveled in the end of the link $d$, which has its other end pivoted on the block $d'$, which is held adjustably in the transverse groove $d^2$ of the disk or wheel $a$, mounted rigidly on the end of the shaft $b$, journaled in brackets on the end of the frame B, and which is rotated by mechanism that will be described hereinafter.

The carriage C is provided with the upwardly-projecting jaws or lugs C², in which the transverse shaft E is held, and on the ends of said shaft, which ends project beyond the sides of said lugs or jaws, the shanks F′ of the U-shaped frame F are mounted to swing.

On the shaft E the united bevel cog-wheel E′ and E² are loosely mounted, the wheel E′ engaging the bevel cog-wheel G, resting on the fork G′, mounted to rock on the shaft E, said cog-wheel G being revolved by the shaft H, which passes loosely through it, and is provided with a longitudinal spline, H′, by which it revolves the cog-wheel G. The lower end of the shaft H is passed through the neck or collar H² on the fork H³, mounted to rock on the shaft I, journaled in brackets on the end of the frame B and below the shaft $b$, said shaft I carrying the bevel cog-wheel I′, engaged with the bevel cog-wheel H⁴ on the lower end of the shaft H.

On one end of the shaft I the worm-wheel J is mounted, and engages the worm J′ on the end of the shaft J², journaled in brackets on the near side of the frame B, which shaft J² is provided with the belt-pulley J³. On the other end of the shaft I the bevel cog-wheel $g$ is rigidly mounted, and with it the bevel cog-wheel $g'$ engages, which is mounted rigidly on the lower end of the upright shaft $h$, journaled on the frame B, and on the upper end of the shaft $h$ the bevel cog-wheel $k$ is rigidly mounted, and engages with the bevel cog-wheel $m$ on the end of the shaft $b$.

The frame F, which is mounted to swing on the shaft E of the carriage C, is provided with the two arms K and L, the former being provided at its upper end with the two lugs or projections K′ and K². In the upper arm, K, the shaft M is mounted to revolve, and is provided at the lower end with the bevel cog-wheel M′, engaged with the bevel cog-wheel E² on the shaft E, and on the upper end of the shaft M the bevel cog-wheel M² is mounted, which is engaged with the bevel cog-wheel N, resting on the top of the lower lug, K², of the arm K, and through which bevel cog-wheel N the shaft O passes loosely, said shaft passing through the lugs K′ and K², and being provided with the spline or feather O′, which is passed through a groove in the side of the aperture in the cog-wheel N. The upper part of the shaft O is passed through an arm, P, fixed on a screw, R, passed through a threaded aperture in the upper lug, K', and having a hand-wheel, R', on its upper end. The upper end of the shaft O can turn in the arm P, but cannot move lengthwise through the same, thus compelling the shaft O to move up and down with the screw R and its arm P. On the lower end of the shaft O the disk S is mounted rigidly below the lower lug, K². On the upper surface of the lower arm, L, of the frame F the disk T is mounted to revolve at the outer end of said arm L.

On the under side of the upper arm, K, the track-bar U is provided, and on the same the stop U' is held adjustable by means of a screw. On the track-bar U the V-shaped gage U² is mounted to slide.

The lower arm, L, of the frame F is provided with the laterally-projecting lugs V' on the side edges, and through said lugs the screws V² are screwed, the lower ends of which can rest on the carriage C.

On one shank of the forked end of the frame F the lug n is formed, in which the spring-bolt o is held, the inner end of which can snap into the aperture p in the side of the carriage C, for the purpose of holding the frame F in place when the same is raised.

An arm, W, projects from the lower part of the frame F, and from said arm the rod W' extends downward, the lower end of which passes through the aperture W² in the upper end of the weight W³, and within a recess, W⁴, in the weight, into which recess the lower end of the rod W' passes. A nut, W⁵, is screwed on said rod, or the rod may be provided with a transverse pin.

The operation is as follows: The glass r, which is to have its edges beveled, is placed on the disk T on the lower arm, L, and then the hand-wheel R' is turned, whereby the shaft O is moved downward and the disk S is pressed upon the glass on the disk T. As the shaft O is revolved by the gearing previously described the disk S is revolved with it, and with the disk S the glass and the disk T, on which it rests, are also revolved. During the time the glass is being adjusted in position in the manner described the entire frame F is swung up, and is held in the raised position by the latch-bolt o. The frame F is then swung down, so that the edge of the glass r rests upon the edge of the abrading-disk A. The screws V² are so adjusted as to support the frame F at the desired inclination and to prevent the frame F moving downward too far. In case the glass r is circular the carriage need not move during the time the edge of the glass is being ground; but when the glass r is elliptical or is oval the carriage must be moved alternately from and toward the edge of the abrading-disk. When the minor axis of the ellipse is at right angles to the axis of the abrading-disk, the carriage must be nearest the edge of the abrading-disk, and when the major axis of the ellipse is at right angles to the abrading-disk the carriage must be farthest from the edge of the abrading-disk. As the disk a revolves the screw D is reciprocated, and thus the carriage is reciprocated, for the purpose set forth above. The stroke of the screw during its reciprocations can be adjusted by adjusting the pin d a greater or less distance from the center of the disk a. When the carriage shall not reciprocate—as, for example, while beveling a circular piece of glass—the pin d is adjusted at the center of the disk a, or the screw disconnected from the link d. The carriage must be adjusted a greater or less distance from the edge of the abrading-disk, according to the diameter of the glass to be beveled, which is accomplished by turning the screw D by means of its hand-wheel D'. The carriage can be reciprocated in the manner set forth at the different adjustments of the carriage from the edge of the abrading-disk, according to the size of the glass. The gage U² is used to adjust the glass concentrically with the disks S and T. The stop U' is adjusted in the requisite position on the track according to the size of the glass and the edges of the glass rested against the shanks of the gage, and the center of the glass will then be directly over the center of the disk T.

It is evident that for larger plates of glass the stop must be adjusted greater distances from the end of the track than for smaller plates—that is, plates having less diameter. The glass plates can be adjusted and locked in place very easily and rapidly, and are beveled in a short time.

In my improved machine an abrading-disk having a narrow edge can be used, and the said abrading-disk is worn off on the edge only and not on the sides or faces. The screws V² prevent the disk from grinding the edges of the glass disk after the desired bevel has been obtained.

When the frame F is swung up, the weight W³ rests on the floor, and does not act on the frame F. When the frame F is swung down, the nut or pin on the lower end of the rod W', within the recess of the weight, strikes the top of the recess of the weight, and the weight is thus raised and counterbalances the frame F, thus preventing the edges of a glass (such as watch-glass) from being broken or chipped through too much weight.

I claim as new and desire to secure by Letters Patent—

1. A glass-beveling machine constructed with a sliding carriage, a pivoted frame on said carriage, revolving glass-clamping devices on said pivoted frame, gearing for revolving said clamping devices, and a sliding gage on the pivoted frame, substantially as herein shown and described.

2. A glass-beveling machine constructed with a sliding carriage, a pivoted frame on said carriage, revolving glass-clamping devices on the pivoted frame, gearing for revolving said clamping devices, a track on the pivoted frame, a stop and a gage on said track, substantially as herein shown and described.

3. A glass-beveling machine constructed with a sliding carriage, a frame pivoted on said carriage, and gearing for reciprocating said carriage from the shaft on which the abrading-disk of the machine is mounted, substantially as herein shown and described.

4. A glass-beveling machine constructed with a sliding carriage, a frame pivoted on said carriage, glass-clamping devices on said frame, a screw passed through a nut on the carriage, and a link connected with a revolving object and with the said screw for the purpose of adjusting the carriage in relation to the abrading-disk and for reciprocating the carriage, substantially as herein shown and described.

5. In a glass-beveling machine, the combination, with a frame, of an abrading-disk mounted to revolve in said frame, a sliding carriage on the frame, a frame pivoted on the carriage, glass-clamping devices on the said frame, an arm projecting from the pivoted frame, a rod connected with the arm, and a weight having a top aperture, through which the said rod is passed into a recess in the weight, a nut or cross-piece being fastened on the said rod within the recess in the weight, substantially as herein shown and described.

THOMAS F. GILROY.

Witnesses:
MARTIN J. GILROY,
T. I. GALLAGHER.